United States Patent [19]

De Haan et al.

[11] Patent Number: 5,742,355
[45] Date of Patent: Apr. 21, 1998

[54] METHOD AND APPARATUS FOR REDUCING NOISE IN A VIDEO SIGNAL

[75] Inventors: Gerard De Haan; Tatiana G. Kwaaitaal-Spassova, both of Eindhoven, Netherlands

[73] Assignee: U.S. Philips Corporation, New York, N.Y.

[21] Appl. No.: 538,514

[22] Filed: Oct. 3, 1995

Related U.S. Application Data

[63] Continuation-in-part of Ser. No. 223,389, Apr. 5, 1994, Pat. No. 5,715,335, which is a continuation-in-part of Ser. No. 161,955, Dec. 2, 1993, abandoned.

[30] Foreign Application Priority Data

Aug. 11, 1994 [WO] WIPO ................................ IB95/00633
Nov. 14, 1994 [EP] European Pat. Off. ............. 94203305

[51] Int. Cl.⁶ .................................................. H04N 5/21
[52] U.S. Cl. .......................... 348/607; 348/619; 348/622; 382/260
[58] Field of Search ......................... 348/607, 619, 348/620, 622, 621, 627; 382/22, 54, 260, 261, 263, 264, 265; H04N 5/21

[56] References Cited

U.S. PATENT DOCUMENTS

| | | | |
|---|---|---|---|
| 4,296,436 | 10/1981 | Achiha | 348/620 |
| 4,504,864 | 3/1985 | Anastassion et al. | 358/167 |
| 4,573,070 | 2/1986 | Cooper | 348/617 |
| 4,658,285 | 4/1987 | Lewis, Jr. | 348/621 |
| 4,707,741 | 11/1987 | Stratton | 348/697 |
| 5,343,254 | 8/1994 | Wada et al. | 348/627 |
| 5,359,674 | 10/1994 | van der Wal | 382/41 |
| 5,495,296 | 2/1996 | Dosho et al. | 348/607 |
| 5,508,751 | 4/1996 | Nitta | 348/607 |

FOREIGN PATENT DOCUMENTS

| | | | |
|---|---|---|---|
| 0581059 | 2/1994 | European Pat. Off. | H04N 5/21 |
| 0601655A1 | 6/1994 | European Pat. Off. | H04N 5/21 |

*Primary Examiner*—Glenton B. Burgess
*Attorney, Agent, or Firm*—Edward W. Goodman

[57] ABSTRACT

In a method of processing a video signal including the steps of providing (13) a delayed signal, and furnishing (11) a filtered signal in response to the video signal and the delayed signal, only a small number of preselected frequency components and/or statistical properties is delayed in the step of providing (13) a delayed signal, in order to reduce a required storage and/or processing capacity.

4 Claims, 4 Drawing Sheets

METHOD AND APPARATUS FOR REDUCING NOISE IN A VIDEO SIGNAL

CROSS-REFERENCE TO RELATED APPLICATIONS

This is a continuation-in-part of application Ser. No. 08/223,389, filed Apr. 5, 1994, now U.S. Pat. No. 5,715,335 which in turn is a continuation-in-part of application Ser. No. 08/161,955, filed Dec. 2, 1993, now abandoned.

BACKGROUND OF THE INVENTION

1. Field of the Invention

The invention relates to a method and apparatus for processing a video signal, for example, for reducing an amount of noise in the video signal. The invention also relates to a television signal receiver comprising such an apparatus.

2. Description of the Related Art

EP-A-0,581,059 discloses a method of recursive noise reduction in television or video signals by means of a circuit arrangement comprising a noise reduction circuit, whose first input signal is the television or video signal, and whose second input signal is the low-frequency part of the output signal of the noise reduction circuit delayed over a field period by means of a field delay circuit. A decimating filter is arranged between the output of the noise reduction circuit and the input of the field delay circuit for reducing the data rate, which allows that a field delay circuit with a smaller storage capacity is used. The decimating filter comprises a low-pass filter for reducing the bandwidth by a factor 2, a quantizer for reducing the amplitude resolution from 8 bits to 7 bits, and a circuit for reducing the data rate by a factor 2. An interpolating filter is arranged between the output of the field delay circuit and the second input of the noise reduction circuit for increasing the data rate.

SUMMARY OF THE INVENTION

It is, inter alia, an object of the invention to provide a video signal processing method and apparatus which require less expensive hardware. To this end, a first aspect of the invention provides a method of processing a video signal, comprising the steps of providing a delayed signal, and furnishing a filtered signal in response to the video signal and the delayed signal, wherein only a small number of preselected frequency components and/or statistical properties is delayed in said step of providing a delayed signal. A second aspect of the invention provides a clamp noise reduction filter for image data signals, comprising means for calculating averages of groups of pixels for every line of pixels to obtain a zero frequency component, memory means for storing one or more of these average values for every line of pixels, filtering means for filtering these average values, and means for modifying a DC level of all pixels in a line with a value related to a difference between an average value of a group of pixels taken from that line and the output of the filtering means. A third aspect of the invention provides a television signal receiver comprising an input for receiving a video signal, means for processing said video signal to furnish a processed video signal, and a display for displaying the processed video signal, the processing means comprising means for providing a delayed signal, and means for furnishing a filtered signal in response to the video signal and the delayed signal, wherein only a small number of preselected frequency components and/or statistical properties is delayed in said means for providing a delayed signal.

In accordance with a primary aspect, the invention provides a video signal processing method comprising the steps of providing a delayed signal, and furnishing a filtered signal in response to the video signal and the delayed signal, in which only a small number of preselected frequency components and/or statistical properties is delayed in the step of providing a delayed signal. This renders it possible to obtain a further reduction of the required storage capacity. As regards the small number of preselected frequency components, only the base band of the signal is considered; it is obvious that when all frequency bands of a sampled signal are considered, even a single preselected frequency component in the base band corresponds to an infinite number of frequency components in the complete frequency spectrum. As regards the statistical property, embodiments comprise the minimum, the maximum, the median, the average, the variance as well as other statistical properties which can easily be conceived by those skilled in the art. In this connection, it is to be noted that the average corresponds to a zero frequency component, and that the median can be considered as an easy-to-calculate approximation of this zero frequency component. The notion "small number" means a number which is small in comparison to the number of picture elements from which the frequency components and/or statistical properties are derived, such that a substantial saving in required storage and/or processing capacity is achieved by replacing these picture elements by the small number of frequency components and/or statistical properties. In one embodiment, the small number equals one value per video line. In another embodiment, the small number equals 7 values per video line.

One implementation of the invention concerns clamp noise reduction for video signals. Clamp noise can be reduced by temporal filtering. However, as field memories are expensive, the present invention proposes to temporally filter only the average value of all (or at least a large portion of the) pixels in a line instead of filtering each individual pixel on that line. The resulting design can be attractive for consumer TV-sets that do not contain field memories. By filtering only the average, the following advantages are obtained. No blurring occurs, and the spatial resolution is not affected as with known noise filtering methods. It is easier to discriminate between motion and noise for a group of pixels than for a single pixel; if the average is taken, the noise is eliminated and the remaining differences are the result of motion only. Alternatively, clamp noise can be eliminated by filtering an extreme value of the video signal.

Another implementation of the invention concerns spatial and/or temporal filtering of image data in the transform domain, in which one or more coefficients resulting from a (partial) block transform on image data are replaced by the output of a spatial and/or temporal filter having only this coefficient and corresponding coefficients in one or more neighboring fields at its input. The filter may be adaptive and/or recursive.

These and other aspects of the invention will be apparent from and elucidated with reference to the embodiments described hereinafter.

DESCRIPTION OF THE PREFERRED EMBODIMENTS

A first implementation of the invention concerns clamp noise reduction for video signals. As is known, clamp noise reduction of image data can be realized by using recursive temporal filters. In this case, for every pixel position $\underline{x}=(x, y)^T$, with $^T$ indicating transposition, and an input luminance value $F(\underline{x}, t)$, the filter output $F_F(\underline{x}, t)$ is defined as:

$$F_F(\underline{x}, t)=k*F(\underline{x}, t)+(1-k)*F_F(\underline{x}, t-T) \tag{1}$$

where k is a control parameter, defining the filter characteristics and T is the field period of the video signal, which equals 20 ms in a 50 Hz environment.

As can be seen from equation 1, for each pixel in the field, the filtered luminance value from the previous field has to be stored in a field memory. However, field memories are expensive. Therefore, in the present implementation of the invention, instead of temporal filtering of individual pixels on a line, temporal filtering of the average value of all (or at least a large portion of the) pixels in that line is proposed. The block diagram of the basic idea is given in FIG. 1.

Figure 1:
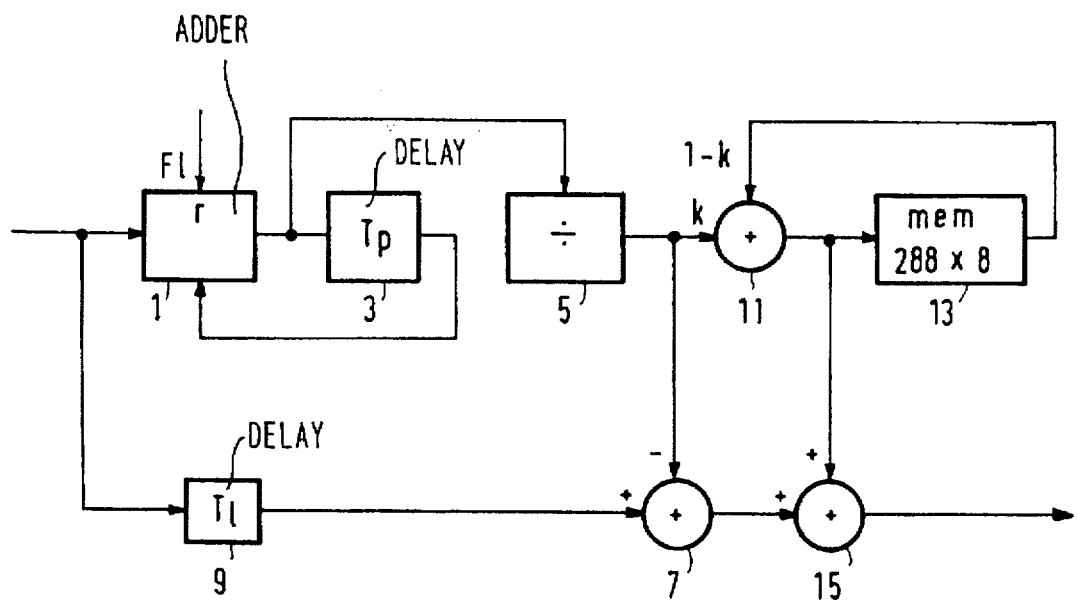
FIG. 1 shows a block diagram of a simple embodiment of a clamp noise reduction filter in accordance with the present invention.

In FIG. 1, an input video signal is applied to a first input of an adder 1 which is reset (input r) by a line frequency signal F1. An output of the adder 1 is applied to a second input of the adder 1 after delay over a pixel delay period Tp by a pixel delay circuit 3, so that the adder 1 determines the sum of all pixel values of a line. A divider 5 divides this sum by the number N of pixels on the line to obtain the average of the pixel values on the line, see equation 2 below. A subtracter 7 determines a difference between an output signal of the divider 5 and the input video signal delayed over a line delay period T1 by a line delay circuit 9. The output signal of the divider 5 is applied to a first input of a mixer 11 whose output is coupled to its second input thru a field delay circuit 13 having a storage capacity sufficient to hold 288 8-bit samples, i.e. one sample for each of the 288 active video lines of a field (of course, with NTSC signals another number of active video lines applies). The mixer 11 multiplies the output signal of the divider 5 by k, and the output signal of the field delay circuit 13 by 1-k, before these two are added together, see equation 3 below. An adder 15 adds the output signal of the mixer 11 to the output signal of the subtracter 7 to obtain an video output signal in accordance with equation 4 below. The filter thus formed is a temporal first-order recursive filter. With a smaller storage capacity of the memory 13, for example, a storage capacity sufficient to hold 10 8-bit samples, the filter becomes a vertical first-order recursive filter. It goes without saying that mixed implementations are possible as well.

The average luminance value $F_A(y, t)$ for a line at vertical position y with N pixels, is defined as:

$$F_A(y,t) = 1/N * \sum_{z=1}^{N} F(\underline{x},t) \tag{2}$$

The filtered average luminance value $F_{AF}(y, t)$ is:

$$F_{AF}(y,t)=k*F_A(y,t)+(1-k)*F_{AF}(y,t-T) \tag{3}$$

The required memory is reduced to about ⅓ of a line memory or 1/720 of a field memory.

The filter output $F_F(\underline{x}, t)$ for a pixel at position x with an input luminance value $F(\underline{x}, t)$ in this case is given by:

$$F_F(\underline{x},t)=F(\underline{x},t)-F_A(y,t)+F_{AF}(y,t) \tag{4}$$

Without interlace and stationary (=non-moving) pictures, the DC-level of a line should be equal to that of the corresponding line in the previous picture. Strong (recursive) filtering of the average value of the pixels (=DC-level) therefore effectively eliminates clamping errors.

With interlace in principle, a frame delay (of one value per line) is required, but much more important is that motion, and particularly vertical motion, can drastically change the average pixel value of a line. A change detector (analogous to a motion detector in temporal filtering on pixel basis) can be applied to adapt the filter. The value of the filter coefficient k is basically a monotonously decreasing function of the absolute difference DIF(y, t) defined as:

$$DIF(y,t)=|F_A(y,t)-F_{AF}(y,t-T)| \tag{5}$$

In this manner, an edge preserving recursive filter is obtained.

A very reliable filter coefficient k is obtained when recursive vertical filtering is applied to the absolute difference DIF(y, t):

$$DIF_F(y,t)=k*DIF(y,t)+(1-k)*DIF_F((y-1),t)+tm \tag{6}$$

The filter coefficient k is then calculated as follows:

$$k=1-(7/(8+DIF_F(y,t))) \tag{7}$$

We found that in the current clamp noise reduction circuit an alternative and even more effective solution of the problem is possible when each line is divided into segments. The background of this segmentation is that it is likely that, at least in one of the segments, no DC-change due to motion has occurred.

For each segment $S_i(y)$, consisting of $N_S$ pixels from the line at position y, an average luminance value $F_A(S_i(y), t)$ is defined as:

$$F_A(S_i(y),t) = 1/N_S * \sum_{\underline{x} \in S_i(y)} F(\underline{x},t) \tag{8}$$

where i∈[1, . . . , n] and n is the number of segments, so $N=n*N_S$. Furthermore, for each segment independently, the average luminance value $F_A(S_i(y), t)$ is filtered and $F_{AF}(S_i(y), t)$ is obtained using the information from the corresponding segment from the previous field:

$$F_{AF}(S_i(y),t)=k*F_A(S_i(y),t)+(1-k)*F_{AF}(S_i(y),t-T) \tag{9}$$

The next problem to be solved is how to find the segment in which no DC-change due to motion has occurred. We propose here to use a differential order statistic filter (DOSF). The assumption is that the least extreme segment is not affected by motion.

The difference $DIF_i(y, t)$ for each segment $S_i(y)$ is found:

$$DIF_i(y,t) = F_A(S_i(y),t) - F_{AF}(S_i(y),t-T) \quad (10)$$

Let $\underline{Dif} = (Dif_1, Dif_2, \ldots, Dif_n)^T$ be a column vector, comprised of the ordered differences i.e. it holds:

$$\forall i \in [1, \ldots, n-1]: Dif_i \leq Dif_{i+1} \quad (11)$$

Then the output of the DOSF can be the average value of the least extreme segment. This segment will be called the reference segment, denoted by S, and defined as:

$$S_r = \underline{Dif} \cdot \underline{C} \quad (12)$$

where $\underline{C}$ is a row matrix of coefficients $C_i$ for which holds:

$$C_i = \begin{cases} 1, & i = (1+n)/2 \\ 0, & \text{else} \end{cases} \quad (13)$$

It was shown to be beneficial to use the average value of more than one segment i.e.:

$$C_i = \begin{cases} 1/2, & i = (1+n)/2 \\ 1/4, & i = ((1+n)/2) \pm 1 \\ 0, & \text{else} \end{cases} \quad (14)$$

The average value of the reference segment is used for the correction of the input signal and the filter output $F_F(\underline{x}, t)$ for a pixel at position $\underline{x}$ with an input luminance value $F(\underline{x}, t)$ is given by:

$$F_F(\underline{x},t) = F(\underline{x},t) - F_A(S_r(y),t) + F_{AF}(S_r(y),t) \quad (15)$$

In practice clipping at black and top-white is required to prevent under and overflows. In an alternative embodiment, the rank number can be modified depending on the magnitude of the differences in individual filters.

In a preferred embodiment each line of a field is divided into seven segments. The memory necessary for storing the filtered average luminance value $F_{AF}(S_i(y), t-T)$ of each segment and every line in this case equals 288*7, which approximately equals the capacity of three line memories. Further, three segments are used in the DOSF and the coefficients $C_i$ are calculated as in equation 14. The output $F_F(\underline{x}, t)$ of the implemented filter for a pixel at position $\underline{x}$ with an input luminance value $F(\underline{x}, t)$ is given by equation 15.

Experimentally it was found that still artifacts can be introduced in clean pictures. This problem was solved by adapting the filters to the amount of clamp noise in the image sequence. To this end, an average correction AC(t) for each field is calculated according to:

$$AC(t) = 1/288 * \sum_y LC(y,t) \quad (16)$$

where LC(y, t) is the line correction for the line at position y and is calculated as:

$$LC(y,t) = |F_{AF}(y,t) - F_A(y,t)| \quad (17)$$

It is expected that in sequences with heavy clamp noise the effect of the filter on the DC-level is stronger than in sequences with little clamp noise. With an ideal working filter and a uniform distribution of the clamp noise it can even be expected that the average correction is close to half the peak level of the clamp noise. Therefore the measured average correction can be used to adapt the filter so that in case of differences larger than the expected peak level of the clamp noise the k of the recursive filters reaches unity. Consequence: with little noise weaker filtering and stronger filtering in case of strong noise.

To achieve the adaptation the calculated average correction in the current field is used to define an interval, which is used in the next field to limit the effect of filtering. In an experimental implementation the interval is defined as:

$$I(t) = 2*AC^2(t-T)+7 \quad (18)$$

The filtered average luminance value $F_{AF}(S_i(y), t)$ (see equation 10) for a given segment $S_i$ with an average luminance value $F_A(S_i(y), t)$ is modified according to:

$$F_{AF}(S_i(y),t) = F_A(S_i(y),t) + \lim[F_{AF}(S_i(y),t) - F_A(S_i(y),t); I(t)] \quad (19)$$

with:

$$\lim[a;b] = \begin{cases} a, & (|a| \leq b) \\ b, & (a > b) \\ -b, & (-a > b) \end{cases} \quad (20)$$

Figure 2:
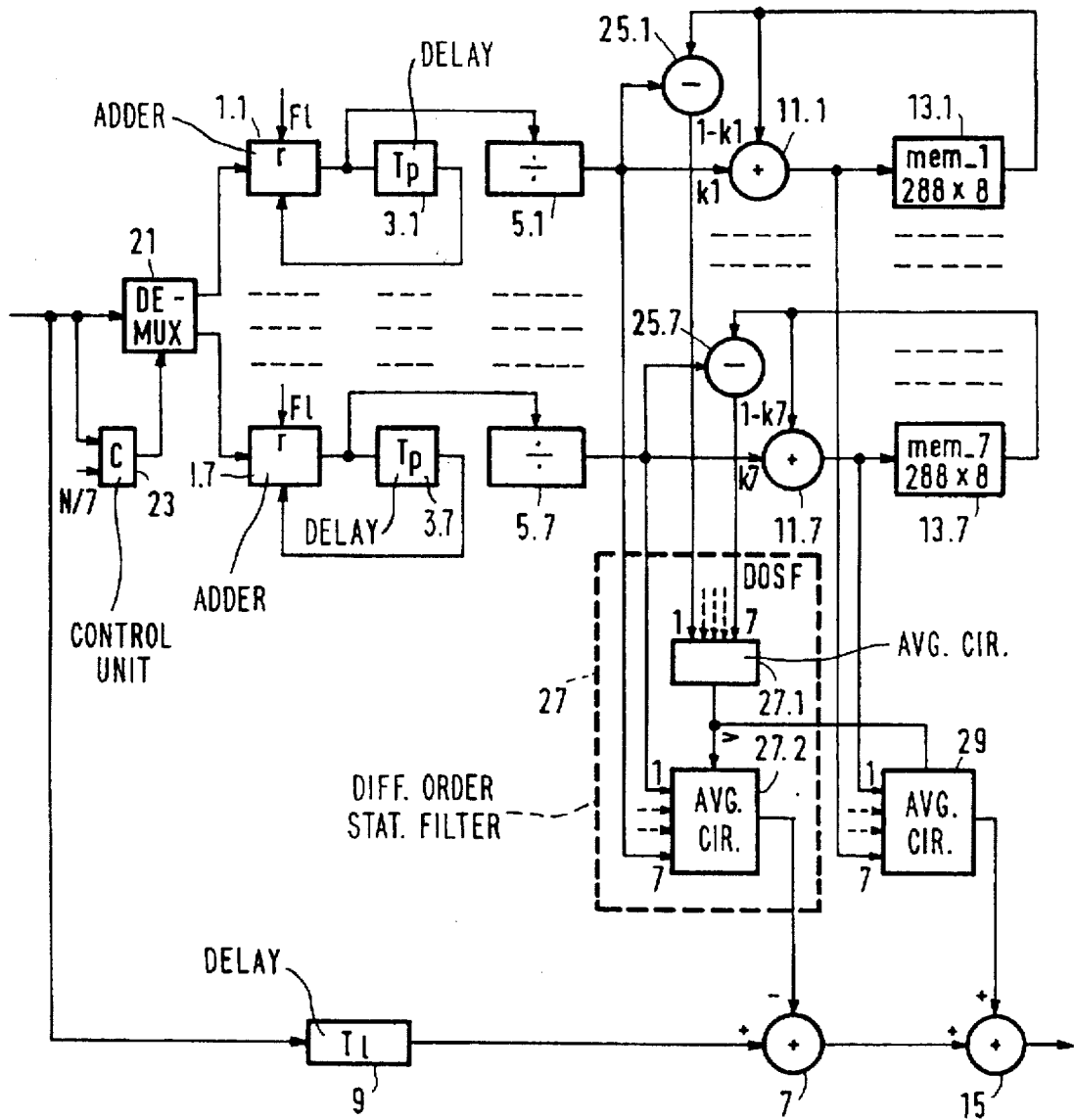
FIG. 2 shows a detailed block diagram of a preferred embodiment of a clamp noise reduction filter.

FIG. 2 shows a block diagram of an elaborated clamp noise reduction filter according to the present invention, which enables a clear understanding of its principle. Only the differences with respect to FIG. 1 will be discussed. The input video signal is applied to a demultiplexer 21 which is controlled by a control unit 23 receiving the input video signal and a number N/7, where N is the number of pixels on a line. The demultiplexer 21 has 7 outputs which are each coupled to a cascade connection of units 1.1, 3.1, 5.1, 11.1, 13.1 thru 1.7, 3.7, 5.7, 11.7, 13.7 as in FIG. 1. Each of these cascade connections is active for a respective segment of a video line, so that each adder 1.i only sums the pixel values of the corresponding line segment and each divider 5.i divides the thus obtained sum by the number N__i of pixels in the corresponding line segment, see equation 9. The thus obtained respective segment averages and the outputs of the respective memories 13.i are applied to respective difference determining circuits 25.i (see equation 10) whose outputs are applied to an order determining circuit 27.1 of a differential order statistic filter (DOSF) 27. The segment averages from the dividers 5.i are applied to respective inputs of a weighted average determining circuit 27.2 in the DOSF 27. The weighted average determining circuit 27.2 is controlled by the order determining circuit 27.1 for determining weighting coefficients in accordance with equation 14, to obtain the reference segment average signal $F_A$ of equation 15, which is applied to the inverting input of the subtracter 7. A second weighted average determining circuit 29, also controlled by the order determining circuit 27.1, receives the output signals of the respective mixers 11.i to obtain the filtered reference segment signal $F_{AF}$ of equation 16, which is applied the adder 15. It thus appears that in the embodiment of FIG. 2, each line is divided into 7 segments of equal length. Of course, other numbers of segments are possible as well, and the segments may have unequal lengths. The segments may overlap. It is not necessary that the totality of the segments occupies the whole video line: there may be gaps between the segments.

Figure 3:
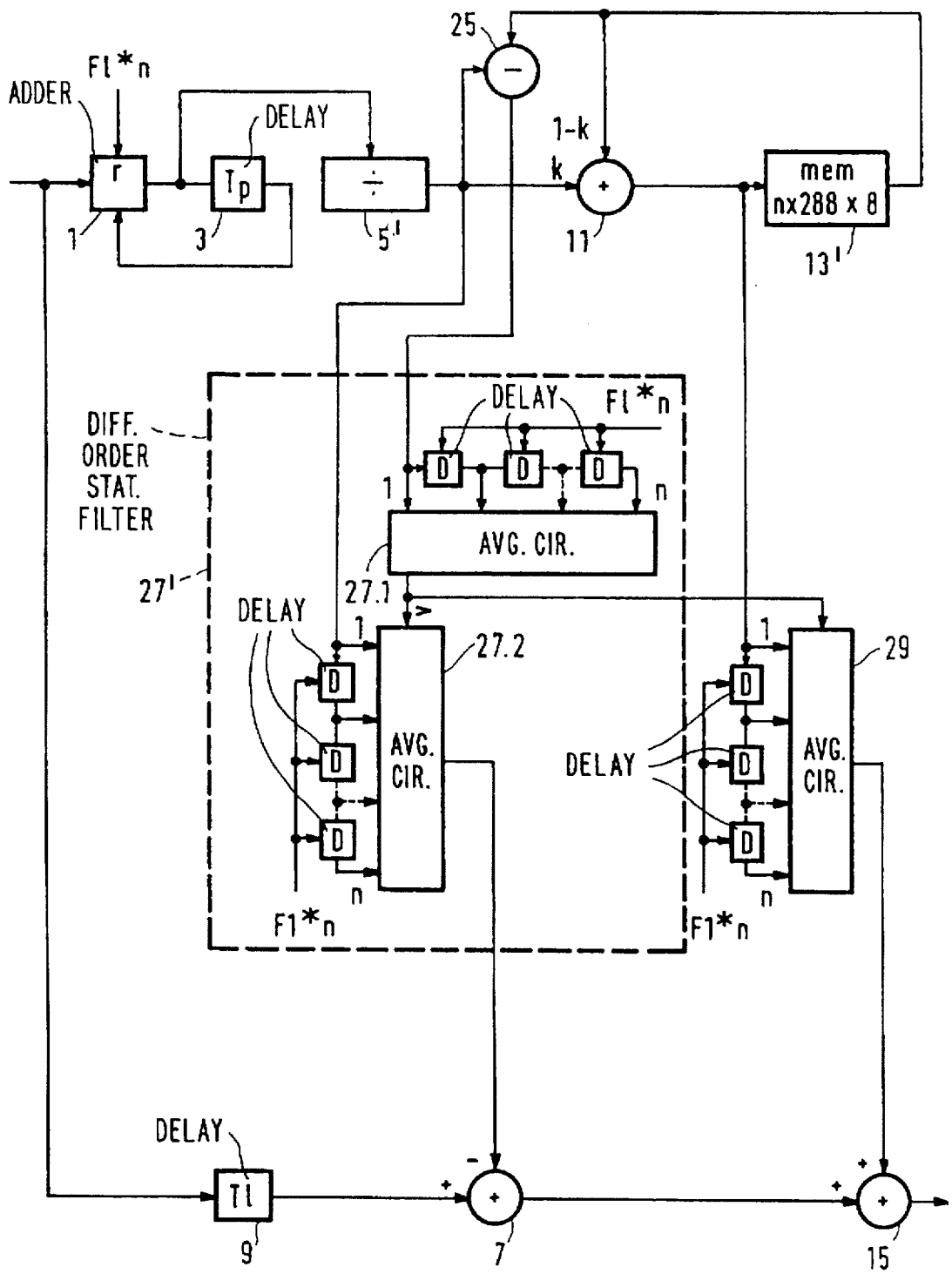
FIG. 3 presents an efficient n-segment implementation of a clamp noise reduction filter.

FIG. 3 shows a more efficient implementation of the clamp noise reduction circuit which is generally applicable for any n-segments embodiment. Only the differences with respect to FIG. 1 will be discussed. The adder 1 is reset (input r) n times per line by a signal F1*n, assuming that there are n segments in each line. A divider 5' divides the thus obtained sum by the number N_i of pixels in the corresponding line segment, to obtain the segment average. A memory 13' has a capacity sufficiently large to store 8-bit segment averages for each of the n segments for each of the 288 active video lines of a field. The segment averages and the outputs of the memory 13' are applied to a difference determining circuit 25 whose output is applied to a first input of an n-input order determining circuit 27.1 of a differential order statistic filter (DOSF) 27'. A tapped delay line of n−1 sample delays (D-flipflops) clocked by a F1*n clock signal is coupled between the first input and the other n−1 inputs of the order determining circuit 27.1.

The segment averages from the divider 5' is applied to a first input of an n-input weighted average determining circuit 27.2 in the DOSF 27'. A tapped delay line of n−1 sample delays (D-flipflops) clocked by a F1*n clock signal is coupled between the first input and the other n−1 inputs of the weighted average determining circuit 27.2. The weighted average determining circuit 27.2 is controlled by the order determining circuit 27.1 for determining weighting coefficients in accordance with equation 14, to obtain the reference segment average signal $F_A$ of equation 15, which is applied to the inverting input of the subtracter 7.

A first input of a second weighted average determining circuit 29, also controlled by the order determining circuit 27.1, receives the output signal of the mixer 11. A tapped delay line of n−1 sample delays (D-flipflops) clocked by a F1*n clock signal is coupled between the first input and the other n−1 inputs of the second weighted average determining circuit 29. The second weighted average determining circuit 29 obtains the filtered reference segment signal $F_{AF}$ of equation 16, which is applied the adder 15.

A preferred embodiment of the above-described first implementation of the invention can be summarized as follows. The lines of a field are divided into segments. The thus DC-component of each segment is calculated. The thus obtained DC-components are temporally filtered, under control of a clip level control signal. Subsequently, a reference segment is selected, i.e., a segment with most likely no motion. The DC-component of the whole line is then corrected by the difference between the filtered and the original DC-component of the reference segment, which step produces the filtered output lines of the algorithm. The clip level control signal, used to control the temporal filtering of the DC-components of each segment, is obtained by calculating the average correction over all lines in a field, and by determining the maximum allowed effect of the temporal filter in dependence upon the calculated average correction.

Another implementation of the invention concerns spatial and/or temporal filtering of image data in the transform domain, in which one or more coefficients resulting from a (partial) block transform on image data are replaced by the output of a spatial and/or temporal filter having only this coefficient and corresponding coefficients in one or more neighboring fields at its input. The filter may be adaptive and/or recursive.

Figure 5:
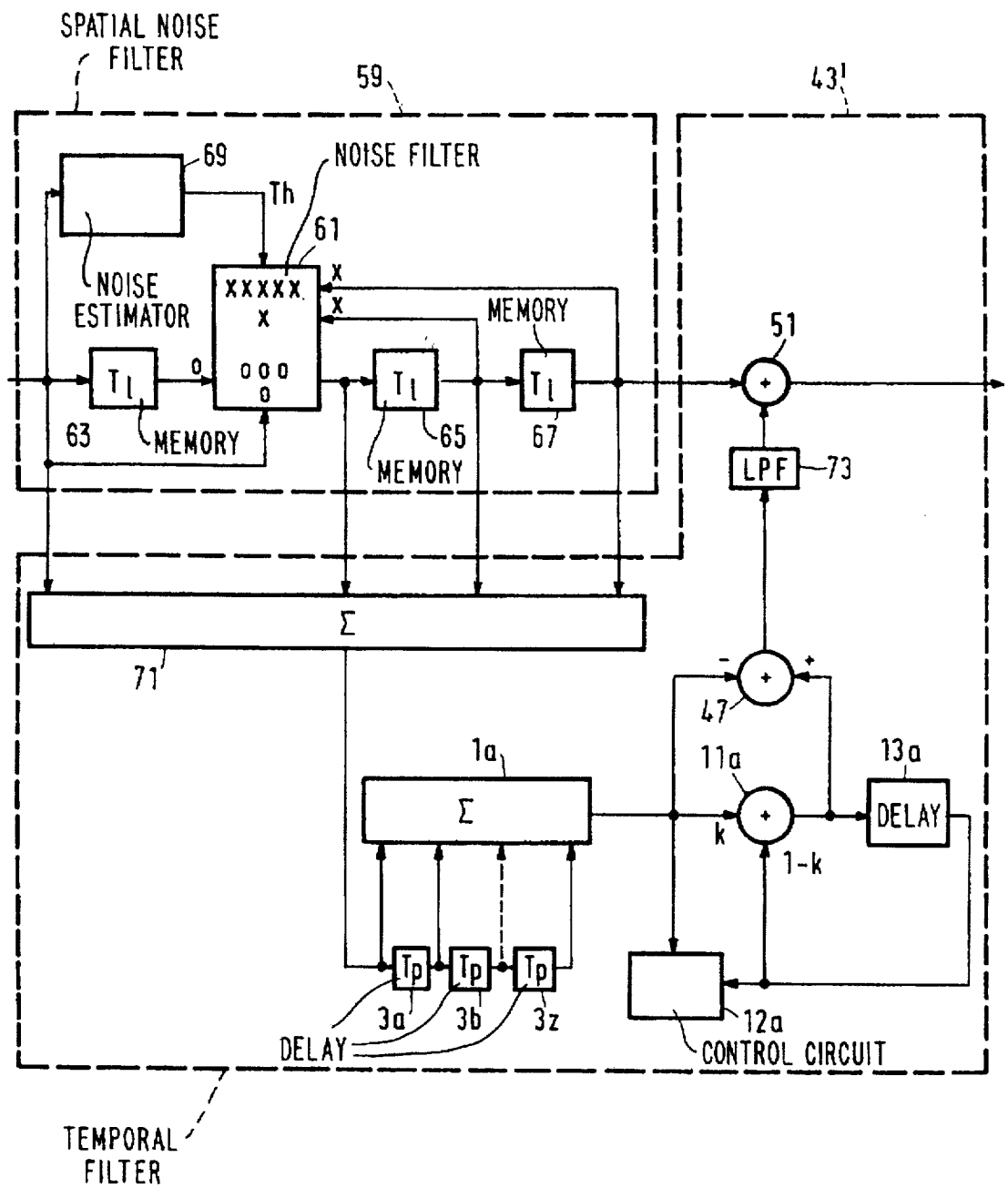
FIG. 5 shows an experimentally tested embodiment of this implementation of the invention.

Spatial noise reduction filters for image data can be effective in removing noise in a fairly broad range of higher spatial frequencies, but will never be successful in removing very low frequent noise. Such noise, however, can be removed by means of a temporal filter. The required field memory is not necessarily expensive if only a few spatial frequency components have to be filtered. For example, it is possible to divide the image into blocks, and to calculate the average of all pixels in each block. These averages are then temporally filtered, and the pixel values of all pixels in a block is corrected with the difference between the filtered average and the original average of that block. The combination (cascade) of a spatial noise filter and a temporal filter on the DC coefficient of a block transform turns out to be very effective. A sophistication results if the correction is low-pass filtered before being applied to the signal. FIG. 5 shows an experimentally tested embodiment of the combination of a spatial noise filter and a temporal filter on the DC coefficient of a block transform with this sophistication.

The present implementation of the invention can also be used to reduce interference artifacts in television pictures, which often introduce a single dominant sinewave in a single direction which corresponds to a single peak in the two-dimensional frequency domain. By means of a partial block transform, it is possible to obtain the frequency coefficient(s) representing this interference, and to correct the signal with the difference between the inverse transform of the temporally filtered version of this or these coefficients and that of the original one. A reduction of the interference is thus obtained without using a full field memory.

Another application of the subject implementation of the invention is to reduce quantization effects introduced in the coefficient domain in a bit rate reducer using block transform coding. Thru adaptive temporal filtering, these quantization errors can be reduced before the inverse transformation to the sample domain. By limiting the filtering to the most visible or most degraded coefficients, it is possible to realize this temporal filtering with less than a pixel field memory. It then becomes also possible to further reduce the bit rate by applying a coarser quantization for a coefficient that on average requires a high bit rate, i.e., a coefficient that carries a large portion of the signal energy, when the resulting artifacts are reduced by means of a temporal filter which is only active for that coefficient. Again, the required field memory is reduced by a factor equal to the number of pixels in the block divided by the number of coefficients that have to be filtered.

Figure 4:
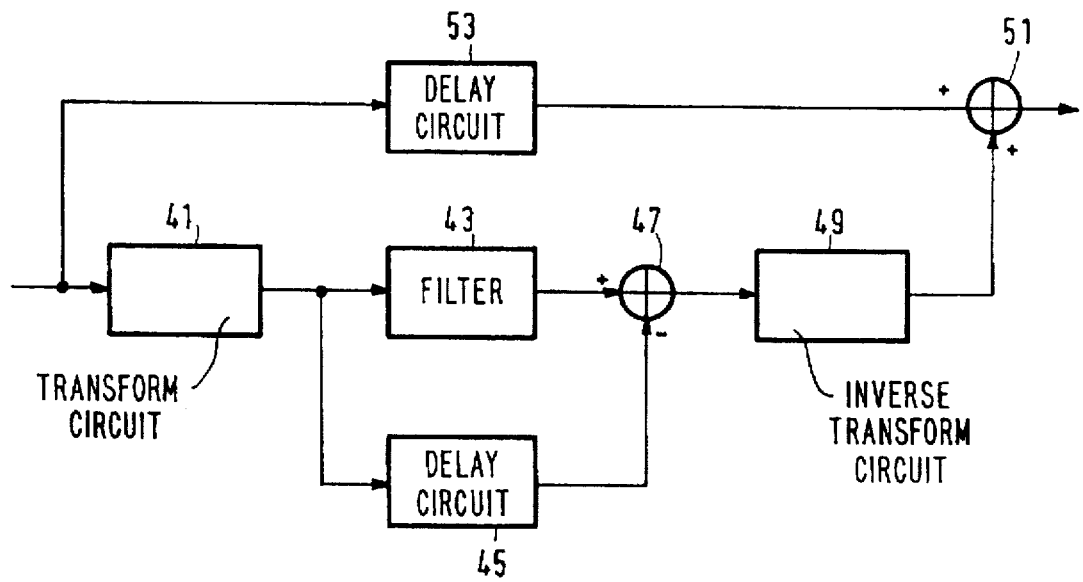
FIG. 4 shows a basic block diagram of an embodiment of an implementation of the invention, in which only a few frequency components are temporally filtered.

FIG. 4 shows a basic block diagram of an embodiment of the subject implementation of the invention. An input video signal is applied to a partial transform circuit 41 which only transforms the frequency coefficient or few coefficients of interest. The output of the partial transform circuit 41 is applied to a filter 43 which may be adaptive and/or temporal, and which comprises a delay which only stores the frequency coefficient or coefficients provided by the partial transform circuit 41. The output of the partial transform circuit 41 is also applied to a compensating delay circuit 45. The output of the compensating delay circuit 45 is subtracted from the output of the filter 43 by a subtracter 47, whose output is applied to a partial inverse transform circuit 49 to obtain data in the spatial domain which corresponds to the difference between the filtered frequency coefficients (from 43) and the unfiltered frequency coefficients (from 45). An adder 51 adds this difference to the input signal after this input signal has been appropriately delayed by a compensating delay circuit 53. Whether the compensating delays 45, 53 are actually required depends on the circumstances of the embodiment in which the invention is applied.

FIG. 5 shows an experimentally tested embodiment of the subject implementation of the invention, in which a spatial noise filter arrangement 59 and a temporal filter arrangement 43' operative on the DC coefficient of a block transform are cascaded. The spatial noise filter arrangement 59 reduces the high-frequency noise, while low-frequency noise is reduced by the temporal filter arrangement 43'. The input video signal is applied to the 2-D spatial noise filter arrangement 59, described in more detail in EP-A-0,601,655 (Attorney's docket PHN 14,320), incorporated by reference herein together with any corresponding patents or patent applications. In the spatial noise filter arrangement 59, the input video signal is applied to a noise filter 61 both directly and thru a line memory 63. An output signal of the noise filter 61 is applied to a cascade connection of line memories 65 and 67, whose outputs are connected to feedback inputs of the noise filter 61. As a consequence, the noise filter 61 is a partially recursive filter which obtains its output signal in response to one unfiltered sample (o) from a current line, three unfiltered samples (o) from a line above the current line, one filtered sample (x) from a line two lines above the current line, and five filtered samples (x) from a line three lines above the current line. A noise estimator 69 provides a threshold signal Th to the noise filter 61 in response to the input video signal.

In the temporal filter arrangement 43', which operates as a block-average filter, a vertical adder 71 receives the input video signal, and the output signals from the noise filter 61 and the line memories 65 and 67. A horizontal adder 1a receives the output signal of the vertical adder 71, and output signals from a cascade array of pixel delays 3a, 3b, . . . , 3z connected to the output of the vertical adder 71. The combined operation of the vertical adder 71 and the horizontal adder 1a results in that the average of a block of pixels is obtained, i.e. the zero frequency component. Put otherwise, a partial transform is carried out resulting in the (0, 0) 2-D spatial frequency component, corresponding to the operation of the partial transform circuit 41 of FIG. 4.

The output of the horizontal adder 1a is applied to a recursive filter 11a–13a which corresponds to the filter 43 of FIG. 4. The recursive filter 11a–13a includes a mixer 11a which adds the output signal of the adder 1a to an output signal of a block field delay 13a in a ratio k: 1–k. The block field delay 13a receives its input signal from the mixer 11a. The mixing factor k is obtained from a control circuit 12a which receives input signals from the outputs of the adder 1a and the block field delay 13a. The input signal from the recursive filter 11a–13a is subtracted from its output signal by the subtracter 47, whose output signal is applied to the adder 51 thru a low-pass filter 73. Another input of the adder 51 is connected to the output of the line memory 67. The adder 51 furnishes the output video signal. As the temporal filter arrangement 43' operates on the zero frequency component, no partial inverse transform circuit 49 is needed in the embodiment of FIG. 5.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. For example, the above description elucidates a clamp-noise reduction filter for image data signals in which the lines of the video signal are divided into a plurality of segments. In an alternative embodiment, the groups of pixels are formed by dividing the pixels in each line over a number of, e.g., 7, (equal) categories, such that the pixels in a category share a property, e.g., they lie in the same luminance interval.

We claim:

1. A clamp-noise reduction filter for image data signals, comprising:

means for calculating averages of groups of pixels for every line of pixels to obtain a zero frequency component;

memory means for storing one or more of these average values for every line of pixels;

filtering means for filtering these average values; and means for modifying a DC level of all pixels in a line with a value related to a difference between an average value of a group of pixels taken from that line and the output of the filtering means.

2. A clamp-noise reduction filter for image data signals according to claim 1, wherein said memory means and said filtering means are coupled to form a temporal first-order recursive filter in which an output of said average calculating means and an output of said memory means are mixed in a ratio k:(1–k) in which k is controlled in dependence upon an absolute difference between the output of said average calculating means and the output of said memory means.

3. A clamp-noise reduction filter for image data signals according to claim 1, wherein said groups of pixels are formed by dividing each line in a number of segments, the averaging means calculating an average for every line-segment, and the filtering means filtering the averages from every segment individually.

4. A clamp-noise reduction filter for image data signals according to claim 2, wherein said groups of pixels are formed by dividing each line into at least three segments, the averaging means calculating an average for every line-segment, and the filtering means filtering the averages from every segment individually, wherein said absolute difference is taken for each segment individually.

* * * * *